US011919588B1

(12) United States Patent
Jia et al.

(10) Patent No.: US 11,919,588 B1
(45) Date of Patent: Mar. 5, 2024

(54) LAYOUT STRUCTURE OF SWING ARM ASSEMBLY

(71) Applicant: AUTO ELECTRIC DRIVE SYSTEM WUXI CO., LTD, Jiangsu (CN)

(72) Inventors: Jie Jia, Jiangsu (CN); Weijian You, Jiangsu (CN)

(73) Assignee: AUTO ELECTRIC DRIVE SYSTEM WUXI CO., LTD, Jiangsu (CN)

( * ) Notice: Subject to any disclaimer, the term of this patent is extended or adjusted under 35 U.S.C. 154(b) by 0 days.

(21) Appl. No.: 18/235,479

(22) Filed: Aug. 18, 2023

(30) Foreign Application Priority Data

Mar. 15, 2023 (CN) .......................... 202310250654.9

(51) Int. Cl.
| | |
|---|---|
| *B62D 7/18* | (2006.01) |
| *B60G 7/00* | (2006.01) |
| *B60K 7/00* | (2006.01) |
| *B62D 7/16* | (2006.01) |

(52) U.S. Cl.
CPC ............... *B62D 7/16* (2013.01); *B60G 7/005* (2013.01); *B60G 7/006* (2013.01); *B60K 7/00* (2013.01); *B62D 7/18* (2013.01)

(58) Field of Classification Search
CPC . B62D 7/16; B62D 7/18; B60G 7/005; B60G 7/006; B60K 7/00
See application file for complete search history.

(56) References Cited

U.S. PATENT DOCUMENTS

| | | | | |
|---|---|---|---|---|
| 7,641,010 | B2 * | 1/2010 | Mizutani .............. | B60K 17/046 180/65.6 |
| 8,453,774 | B2 * | 6/2013 | Nagaya .................. | B60K 17/30 180/65.6 |
| 9,796,235 | B2 * | 10/2017 | Matayoshi ........... | B60G 15/067 |
| 10,919,571 | B2 * | 2/2021 | Bertassi .................. | B60G 3/20 |
| 2006/0048978 | A1 * | 3/2006 | Nagaya .................... | B62D 7/18 180/6.48 |
| 2008/0093133 | A1 * | 4/2008 | Yogo ...................... | B60G 13/16 180/55 |
| 2009/0133944 | A1 * | 5/2009 | Nishioka ................ | B60G 7/008 180/65.6 |

(Continued)

FOREIGN PATENT DOCUMENTS

| | | |
|---|---|---|
| CN | 106627102 A | 5/2017 |
| CN | 111186270 A | 5/2020 |

(Continued)

*Primary Examiner* — Toan C To

(74) *Attorney, Agent, or Firm* — Cooper Legal Group, LLC

(57) ABSTRACT

A layout structure of swing arm assembly is disclosed, including a rim, a hub motor, a steering knuckle, and a swing arm component, wherein a tire is mounted at the rim, the hub motor is located in the rim, the rim is connected to a rotor of the hub motor; the steering knuckle is fixedly connected to a stator of the hub motor; the swing arm component comprises an upper swing arm and a lower swing arm; the lower swing arm is universally connected with the stator of the hub motor to form a first hinge point, the upper swing arm is universally connected with the steering knuckle to form a second hinge point, a connection line between the first hinge point and the second hinge point constitutes a virtual kingpin axis, and a top end of the virtual kingpin axis is inclined towards the inside of the vehicle.

8 Claims, 4 Drawing Sheets

(56) References Cited

U.S. PATENT DOCUMENTS

| | | | | |
|---|---|---|---|---|
| 2015/0061440 | A1* | 3/2015 | Catalan | H02K 16/00 310/156.01 |
| 2020/0239068 | A1* | 7/2020 | Hallundbæk | B62D 7/18 |
| 2023/0234415 | A1* | 7/2023 | Seong | B60G 7/02 280/93.512 |

FOREIGN PATENT DOCUMENTS

| | | |
|---|---|---|
| CN | 112659837 A | 4/2021 |
| JP | H05116546 A | 5/1993 |
| JP | 2003300420 A | 10/2003 |
| JP | 2005014729 A | 1/2005 |
| JP | 2005329817 A | 12/2005 |
| JP | 2009248902 A | 10/2009 |
| JP | 2013103665 A | 5/2013 |
| WO | 2013073308 A | 5/2013 |
| WO | 2023145468 A | 8/2023 |

* cited by examiner

LAYOUT STRUCTURE OF SWING ARM ASSEMBLY

CROSS-REFERENCE TO RELATED APPLICATION

The present application is based on and claims the priority benefits of China application No. 202310250654.9, filed on Mar. 15, 2023. The entirety of China application No. 202310250654.9 is hereby incorporated by reference herein and made a part of this specification.

TECHNICAL FIELD

The present application relates to the technical field of automobile chassis, and, particularly, to a layout structure of swing arm assembly.

BACKGROUND ART

Currently, energy and environmental issues have gradually become important factors, which restrict the continuous development of human society. Therefore, the rise of energy saving and environment-protective electric vehicles is inevitable. Vehicle electrification becomes a general trend, and a motor, as a core component thereof, is a main driving mode, which plays an important role in a development process of new energy vehicles.

Hub motors are considered as the main driving mode of the electric vehicle in the future due to many advantages thereof. A power system, a transmission system, and a braking system are integrated together and are integrally mounted in the rim by a hub motor. However, the hub motor occupies partial space when it is mounted in the rim, which leads to reduction of the original axial space in the rim. If a traditional suspension structure should be retained, the whole suspension system must be translated to the inside of the vehicle, which increases kingpin offset, that is, a distance from an intersection of a kingpin (the steering axis) and the ground to a grounding center of the tire increases.

There are at least the following technical problems in the related technique: when the vehicle is turned, the steering wheel is turned around the steering axis, wherein the steering resistance torque of the ground is proportional to the kingpin offset. The smaller the kingpin offset is, the smaller the steering resistance torque is. If the kingpin offset is increased, it will bring a series of harmful effects to the vehicle such as increase of the steering resistance torque, a larger turning radius, a larger change of four-wheel alignment parameters when the vehicle jumps, and the like.

SUMMARY

In order to reduce a kingpin offset of the vehicle, a layout structure of swing arm assembly is disclosed.

The following technical solution is adapted by the layout structure of swing arm assembly disclosed:

A layout structure of swing arm assembly, comprising a rim, a hub motor, a steering knuckle, and a swing arm component, wherein the rim is mounted with a tire, the hub motor is located in the rim, the rim is connected to a rotor of the hub motor; the steering knuckle is fixedly connected to a stator of the hub motor at a position close to an inside of a vehicle; the swing arm component comprises an upper swing arm connected between the steering knuckle and a vehicle subframe, and a lower swing arm connected between the stator of the hub motor and the vehicle subframe; the lower swing arm is universally connected with the stator of the hub motor to form a first hinge point, the upper swing arm is universally connected with the steering knuckle to form a second hinge point, a connection line between the first hinge point and the second hinge point constitutes a virtual kingpin axis, and a top end of the virtual kingpin axis is inclined towards the inside of the vehicle.

In the above technical solution, the lower swing arm is universally connected with the stator of the hub motor while the upper swing arm is universally connected with the steering knuckle, so that the connection line between the first hinge point and the second hinge point constitutes the virtual kingpin axis, additionally, the top end of the virtual kingpin axis is inclined towards the inside of the vehicle. Therefore, an intersection of the virtual kingpin axis and the ground is close to a grounding center of the tire, which can reduce the kingpin offset greatly and steering resistance torque, and effectively reduce abrasion of the tire. When the hub motor is applied to drive an electric vehicle, the steering radius of the vehicle wouldn't vary excessively, and the suspension alignment parameters has little change when tire jumps, which finally improves the dynamic response capability, the braking performance, the handling and the stability of the running track of the tire of the whole vehicle.

In addition, if the layout structure of the present application is combined with enough steering space, a large steering angle can be achieved by the electric vehicle with hub motor without interference.

The inclined angel of the virtual kingpin axis has a lager adjustable range based on the layout form of the present application. The distance from the intersection of the virtual kingpin axis and the ground to the center of the tire can be changed by fine adjustment of the locations of the first hinge point and the second hinge point, to adjust the kingpin offset, such that the kingpin offset can be adaptively modified according to requirements of different vehicles, to meet chassis tuning requirements of different vehicles.

Optionally, the connection line between the first hinge point and the second hinge point is coincided with a grounding center of the tire.

In the above technical solution, when the connection line between the first hinge point and the second hinge point is coincided with the grounding center of the tire, the kingpin offset is zero, and the steering resistance torque of the vehicle is minimum, which can further reduce abrasion of the tire, and further improve the dynamic response capability, the braking performance, the handling and the stability of the running track of the tire of the whole vehicle.

Optionally, the steering knuckle includes a connection ring fixedly connected to the hub motor and an extension arm arranged on the connection ring; a side of the extension arm close to the upper swing arm is inclined upward and configured with a horizontal first connection portion; the first connection portion is configured with an upper ball joint, and an end of the upper swing arm close to the steering knuckle is universally connected with the upper ball joint.

In the above technical solution, the steering knuckle is configured with the horizontal first connection portion, so that the upper ball joint is stably connected to the first connection portion, and it is convenient to universally connect the upper swing arm with the upper ball joint.

Optionally, the connection ring, the extension arm and the first connection portion are integrally-formed.

In the above technical solution, the entire steering knuckle is integrally-formed, which improves the structural strength and the work stability of the steering knuckle itself.

Optionally, the upper swing arm includes two first connection arms extending horizontally along a transverse direction of the vehicle and a second connection arm for connection the first connection arms and the steering knuckle; the two first connection arms extend parallel to each other along a longitudinal direction of the vehicle, all the first connection arms are located at a side of the steering knuckle close to front or rear of the vehicle; and the first connection arms extend at an obtuse angle to the second connection arm. The lower swing arm includes a swing arm body, the swing arm body has an identical structure as the upper swing arm.

In the above technical solution, all the first connection arms are arranged at the side of the steering knuckle close to front or rear of the vehicle, and the first connection arms extend at an obtuse angle to the second connection arm, so that a connection between the upper swing arm and the steering knuckle is located on a position of the upper swing arm farthest away from the front or rear of the vehicle. When the steering knuckle is turned around the connection between the upper swing arm and the steering knuckle, the tire is not prone to interfere with the upper swing arm, which increases the steering angle of the vehicle to the maximum, to achieve the steering requirements of distributed driving of various drive-modes such as turning around in place, lateral driving, normal driving, and the like.

Optionally, the first connection arms and the second connection arm are integrally-formed, and a connection between the first connection arms and the second connection arm is configured as an arc-shaped transition.

In the above technical solution, the upper swing arm is constructed as one piece, and the connection between the first connection arms and the second connection arm is configured as an arc-shaped transition, which greatly increases the whole strength of the upper swing arm and contributes to increase the chassis rigidity such that it can stably work with low failure rate, and the handling of the vehicle is improved.

Optionally, a side of the hub motor close to the inside of the vehicle is provided with a brake disc, the brake disc is coaxially connected to the rotor of the hub motor; the brake disc is located between the upper swing arm and the lower swing arm, an end of the lower swing arm is provided with a swing arm connection portion, the swing arm connection portion extends vertically; the stator of the hub motor is provided with a lower ball joint, and a top end of the swing arm connection portion is universally connected with the lower ball joint.

In the above technical solution, the lower swing arm is provided with the vertical swing arm connection portion, such that an end of the lower swing arm close to the hub motor is shaped in form of L, thereby the lower swing arm can be kept away from the brake disc, thus reducing the possibility of an interference between the lower swing arm and a brake assembly. Swing arm connection portions with different vertical heights can also be applied according to the diameter of the brake disc to meet different requirements of users.

Optionally, the swing arm connection portion is integrally formed with the lower swing arm.

In the above technical solution, the swing arm connection portion is integrally formed with the lower swing arm, which greatly improves the connection strength of the swing arm connection portion and the lower swing arm, thereby further improving the work stability of the swing arm connection portion.

In summary, at least one of the following beneficial technical effects is included:

In the present application, the intersection of the virtual kingpin axis and the ground is close to the grounding center of the tire, which can reduce the kingpin offset greatly and steering resistance torque, and effectively reduce abrasion of the tire. When the hub motor is applied to drive an electric vehicle, the steering radius of the vehicle wouldn't vary excessively, and the kingpin offset is reduced, such that the suspension alignment parameters has little change when tire jumps, which finally improves the dynamic response capability, the braking performance, the handling and the stability of the running track of the tire of the whole vehicle. The inclined angel of the virtual kingpin axis has a lager adjustable range based on the layout form of the present application. The distance from the intersection of the virtual kingpin axis and the ground to the center of the tire can be changed by fine adjustment of the locations of the first hinge point and the second hinge point, to adjust the kingpin offset, such that the kingpin offset can be adaptively modified according to requirements of different vehicles, to meet chassis tuning requirements of different vehicles.

All the first connection arms are arranged at the side of the steering knuckle close to front or rear of the vehicle, and the first connection arms extend at an obtuse angle to the second connection arm, so that a connection between the upper swing arm and the steering knuckle is located on a position of the upper swing arm farthest away from the front or rear of the vehicle. When the steering knuckle is turned around the connection between itself and the upper swing arm, the tire is not prone to interfere with the upper swing arm, which increases the steering angle of the vehicle to the maximum, to achieve the steering requirements of distributed driving of various drive-modes such as turning around in place, lateral driving, normal driving, and the like.

The lower swing arm is provided with the vertical swing arm connection portion, such that an end of the lower swing arm close to the hub motor is shaped in form of L, thereby the lower swing arm can be effectively kept away from the brake disc, thus reducing the possibility of an interference between the lower swing arm and a brake assembly. Swing arm connection portions with different vertical heights can also be applied according to the diameter of the brake disc to meet different requirements of users.

DETAILED DESCRIPTION

The present application is further described in detail below in combination with FIGS. 1-4.

Figure 1:
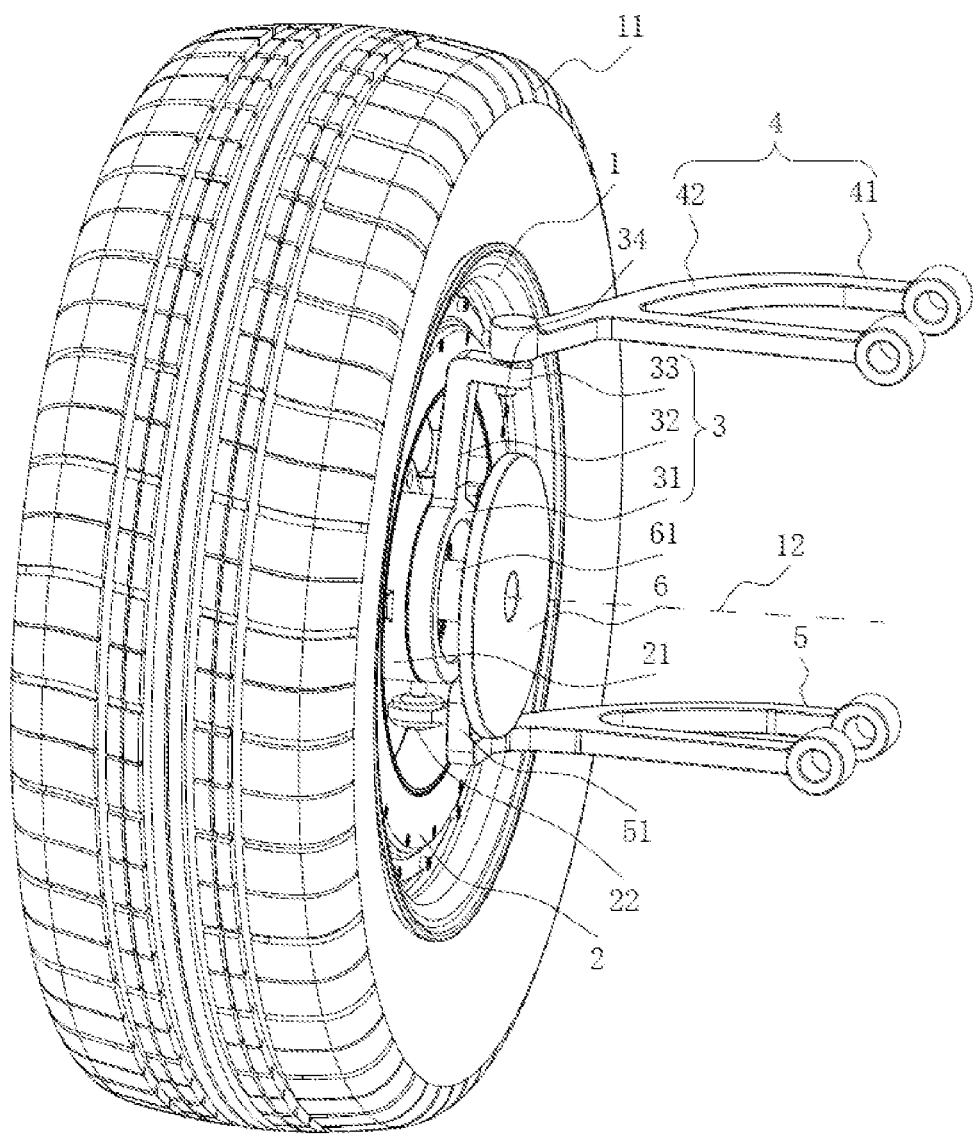
FIG. 1 is an overall structure diagram according to an embodiment of the present application.

An embodiment of the present application discloses a layout structure of swing arm assembly. Referring to FIG. 1, the layout structure of swing arm assembly includes a rim 1, a hub motor 2, a steering knuckle 3, a brake disc 6 and a swing arm component. A tire 11 is installed at the rim 1, and the hub motor 2 is located in the rim 1. The rim 1 is fixedly connected to a rotor of the hub motor 2 by a bolt, and the steering knuckle 3 is fixedly connected to a stator 21 of the hub motor 2 and located at the hub motor 2 close to the inside of a vehicle.

Figure 2:
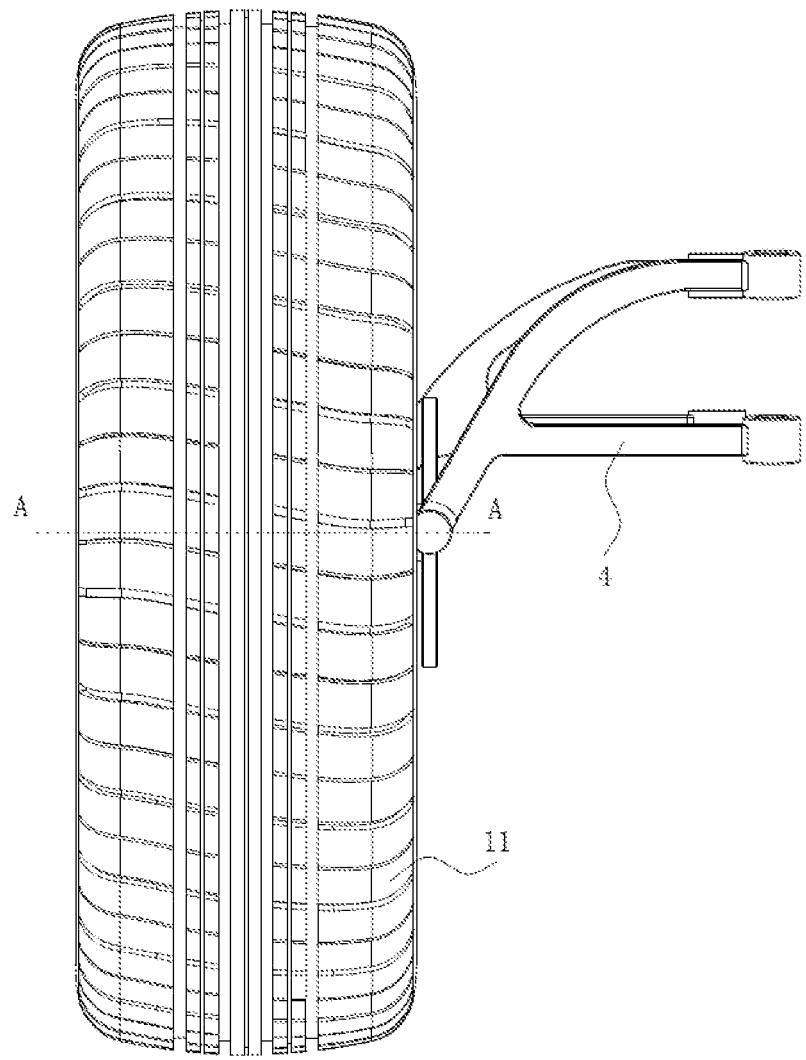
FIG. 2 is a top view of the overall structure according to an embodiment of the present application.
Figure 3:
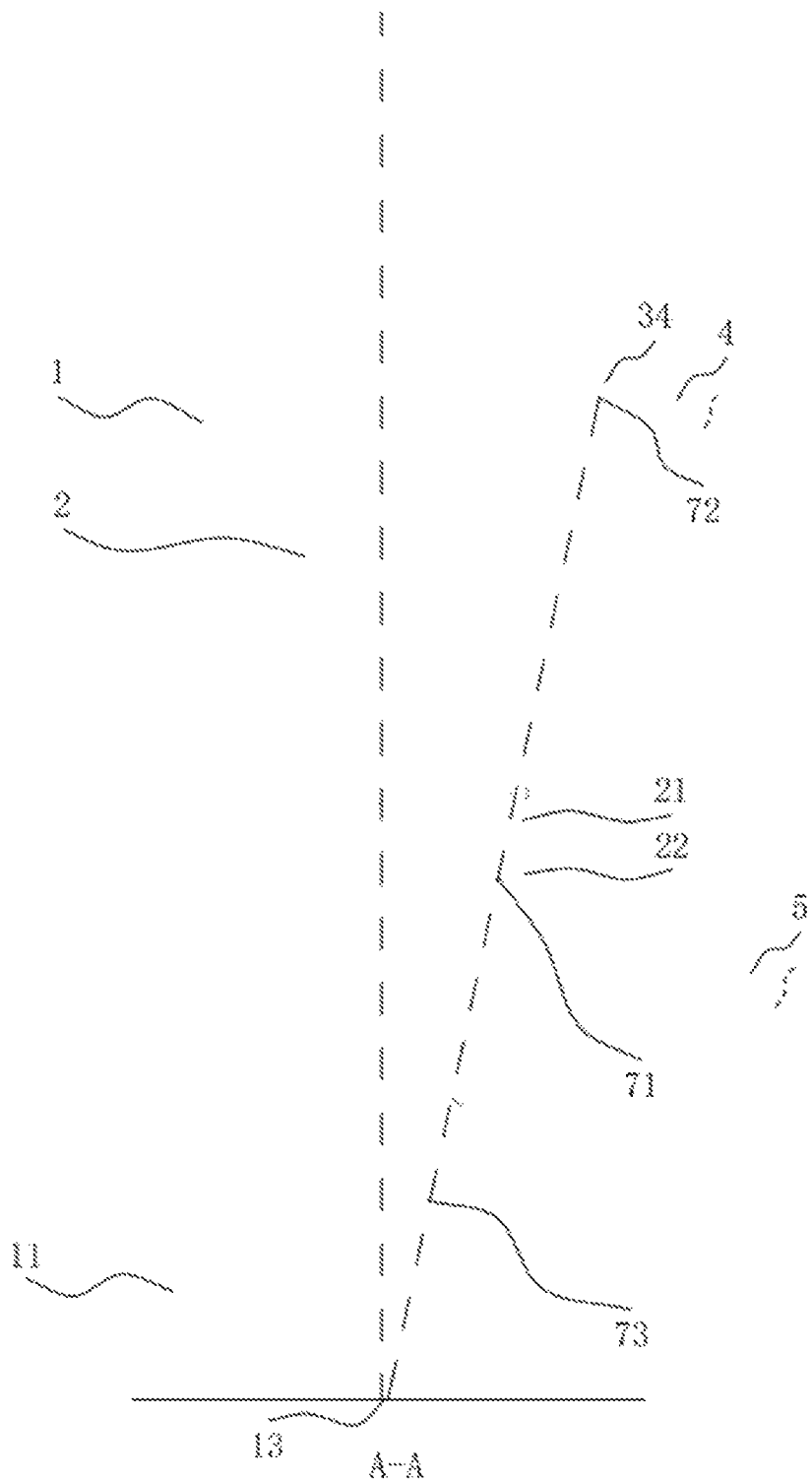
FIG. 3 is a section view along A-A line in FIG. 2.

Referring to FIG. 1, FIG. 2 and FIG. 3, the swing arm component includes an upper swing arm 4 and a lower swing arm 5. A first end of the lower swing arm 5 is connected to a vehicle subframe, and a second end thereof is universally connected with the stator 21 of the hub motor 2 to form a first hinge point 71. A first end of the upper swing arm 4 is connected to the vehicle subframe, and a second end thereof is universally connected with the steering knuckle 3 to form a second hinge point 72. The first hinge point 71 and the second hinge point 72 are located in a same vertical plane, and a connection line between the first hinge point 71 and the second hinge point 72 constitutes a virtual kingpin axis 73. The virtual kingpin axis 73 is crossed with an axis 12 of the rim 1, an intersection of the virtual kingpin axis 73 and the ground is coincided with a grounding center 13 of the tire 11.

Referring to FIG. 2 and FIG. 3, when the connection line between the first hinge point 71 and the second hinge point 72 is coincided with the grounding center 13 of the tire 11, a kingpin offset is zero, and a steering resistance torque of the vehicle is minimum, which can effectively reduce abrasion of the tire 11. Reduction of the kingpin offset may lead to a small change of the suspension alignment parameters when the tire 11 jumps, which finally improves the dynamic response capability, the braking performance, the handling and the stability of the running track of the tire 11 of the whole vehicle.

Referring to FIG. 3, the layout structure of the present application can also be so configured, that the distance from the intersection of the virtual kingpin axis 73 and the ground to the center of the tire 11 can be changed by fine adjustment of the locations of the first hinge point 71 and the second hinge point 72, to adjust the kingpin offset, such that the kingpin offset can be adaptively modified according to requirements of different vehicles to meet chassis tuning requirements of different vehicles.

Referring to FIG. 1 and FIG. 3, the steering knuckle 3 includes a connection ring 31 and an extension arm 32 which are integrally formed. The connection ring 31 is fixedly connected to the hub motor 2 and is coaxially arranged with the rim 1. The extension arm 32 is located directly above the axis of the connection ring 31. A first end of the extension arm 32 is connected to the connection ring 31, while a second end thereof is inclined upward and is integrally formed with a first connection portion 33. The first connection portion 33 extends horizontally and is fastened with an upper ball joint 34. An end of the upper swing arm 4 close to the steering knuckle 3 is universally connected with the upper ball joint 34.

Referring to FIG. 1, the upper swing arm 4 includes first connection arms 41 and a second connection arm 42 which are integrally formed. The first connection arms 41 extend horizontally along the transverse direction of vehicle. It is provided with two first connection arms 41 parallel to each other along the longitudinal direction of vehicle, the two first connection arms 41 are located in a same horizontal plane. All the first connection arms 41 are located at a side of the steering knuckle 3 close to the front or rear of the vehicle. In this embodiment, all the first connection arms 41 are located at a side of the steering knuckle 3 close to the front of the vehicle. And the first connection arms extend at an obtuse angle to the second connection arm 42. A connection between the first connection arms 41 and the second connection arm 42 is configured as an arc-shaped transition. The lower swing arm 5 has a same structure as the upper swing arm 4, and the lower swing arm 5 is located below the upper swing arm 4.

Figure 4:
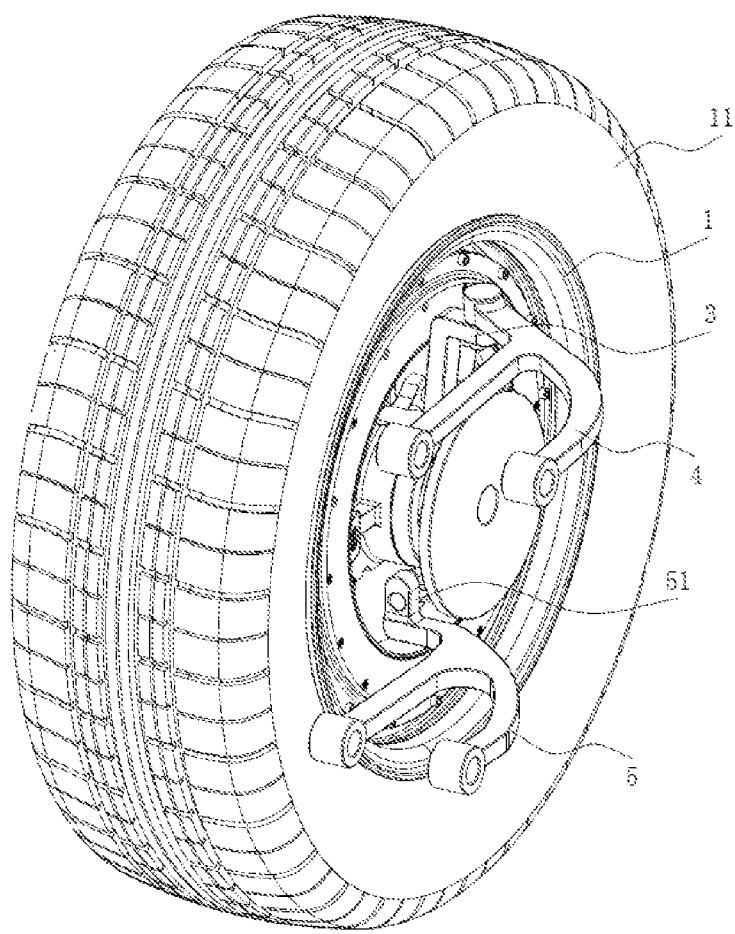
FIG. 4 is a schematic view of a tire after rotation of 90° according to an embodiment of the present application.

Referring to FIG. 1 and FIG. 4, in this embodiment, all the first connection arms 41 are arranged at the side of the steering knuckle 3 close to the front of the vehicle, and the first connection arms 41 extend at an obtuse angle to the second connection arm 42. The upper swing arm 4 is so configured, that the connection between the upper swing arm 4 and the steering knuckle 3 is located at the upper swing arm 4 farthest away from the front of the vehicle. When the steering knuckle 3 is turned around the upper ball joint 34, the tire 11 does not intend to interfere with the upper swing arm 4, which can increase the steering angle of the vehicle to the maximum. The steering angle of the tire 11 can reach 90°, to achieve the steering requirements of distributed driving of various drive-modes such as turning around in place, lateral driving, normal driving, and the like.

Referring to FIG. 1 and FIG. 4, a side of the hub motor 2 close to the inside of the vehicle is provided with a brake disc 6, which is coaxially and fixedly connected with a connection shaft 61. The connection shaft 61 is coaxially and fixedly connected to the rotor of the hub motor 2, and the brake disc 6 is located between the upper swing arm 4 and the lower swing arm 5. The lower swing arm 5 is connected to the stator 21 of the hub motor 2, which leads to a smaller distance between the lower swing arm 5 and the brake disc 6. In order to prevent an interference between the lower swing arm 5 and the brake disc 6, an end of the lower swing arm 5 is integrally formed with a swing arm connection portion 51, the swing arm connection portion 51 extends vertically. The stator 21 of the hub motor 2 is fixedly provided with a lower ball joint 22 located directly below the axis of the hub motor 2, and the top end of the swing arm connection portion 51 is universally connected with the lower ball joint 22.

Referring to FIG. 1 and FIG. 4, the swing arm connection portion 51 extends vertically, such that an end of the lower swing arm 5 close to the hub motor 2 is shaped in form of "L", which increases a vertical distance between the lower swing arm 5 and the brake disc 6 and reduces a possibility of an interference between the lower swing arm 5 and a brake assembly. Swing arm connection portions 51 with different vertical heights can also be applied according to the diameter of the brake disc 6, to meet different requirements of users.

The implementation principle of the layout structure of swing arm assembly in the embodiment of the present application is that the upper ball joint 34 is provided above the steering knuckle 3, the upper swing arm 4 is universally connected with the upper ball joint 34 to form the second hinge point 72. The lower ball joint 22 is fixedly provided at the stator 21 of the hub motor 2, the lower swing arm 5 is universally connected with the lower ball joint 22 to form the first hinge point 71. The first hinge point 71 is lower than the second hinge point 72, and located at a side of the second hinge point 72 close to the inside of the vehicle, so that the connection line between the first hinge point 71 and the second hinge point 72 constitutes the virtual kingpin axis 73, and the intersection of the virtual kingpin axis 73 and the ground is coincided with a center plane of the tire 11, which greatly reduces the kingpin offset.

The kingpin offset is decreased, such that the steering resistance torque is decreased, which can effectively reduce abrasion of the tire 11. Meanwhile, the reduction of the kingpin offset may lead to a smaller change of the suspension alignment parameters when wheel jumps, which finally improves the dynamic response capability, the braking performance, the handling and the stability of running track of the tire 11 of the whole vehicle.

In addition, if the layout form of the upper swing arm 4 and the lower swing arm 5 in the present application is combined with enough steering space, a large steering angle can be achieved by an electric vehicle with hub motor 2 without intending to interfere, which meets the steering requirements of distributed driving of various drive-modes.

The above are the preferred embodiments of the present application, which are not intended to limit the protection scope of the present application. Therefore, all equivalent changes made according to the structure, shape and principle of the present application should be covered within the protection scope of the present application.

REFERENCE SIGNS LIST 1 rim
11 tire
12 axis
13 grounding center
2 hub motor
21 rotor
22 lower ball joint
3 steering knuckle
31 connection ring
32 extension arm
33 first connection portion
34 upper ball joint
4 upper swing arm
41 first connection arm
42 second connection arm
5 lower swing arm
51 swing arm connection portion
6 brake disc
61 connection shaft
71 first hinge point
72 second hinge point
73 virtual kingpin axis

What is claimed is:

1. A layout structure of swing arm assembly, comprising a rim, a hub motor, a steering knuckle, and a swing arm component, wherein a tire is mounted at the rim, the hub motor is located in the rim, the rim is connected to a rotor of the hub motor; the steering knuckle is fixedly connected to a stator of the hub motor at a position close to an inside of a vehicle; the swing arm component comprises an upper swing arm connected between the steering knuckle and a vehicle subframe, as well as a lower swing arm connected between the stator of the hub motor and the vehicle subframe; the lower swing arm is universally connected with the stator of the hub motor to form a first hinge point, the upper swing arm is universally connected with the steering knuckle to form a second hinge point, a connection line between the first hinge point and the second hinge point constitutes a virtual kingpin axis, a top end of the virtual kingpin axis is inclined towards the inside of the vehicle, the steering knuckle comprises a connection ring fixedly connected to the hub motor and an extension arm on the connection ring, a side of the extension arm close to the upper swing arm is inclined upward and configured with a horizontal first connection portion, the horizontal first connection portion is configured with an upper ball joint, and an end of the upper swing arm close to the steering knuckle is universally connected with the upper ball joint.

2. The layout structure of swing arm assembly according to claim 1, wherein the connection line between the first hinge point and the second hinge point coincides with a grounding center of the tire.

3. The layout structure of swing arm assembly according to claim 1, wherein the connection ring, the extension arm and the horizontal first connection portion are integrally-formed.

4. The layout structure of swing arm assembly according to claim 1, wherein the upper swing arm comprises two first connection arms extending horizontally along a transverse direction of the vehicle and a second connection arm for connecting the two first connection arms and the steering knuckle; the two first connection arms extend parallel to each other along a longitudinal direction of the vehicle, the two first connection arms are located at a side of the steering knuckle close to a front or a rear of the vehicle; and the two first connection arms extend at an obtuse angle to the second connection arm.

5. The layout structure of swing arm assembly according to claim 4, wherein the two first connection arms and the second connection arm are integrally-formed, and a connection between the two first connection arms and the second connection arm is configured as an arc-shaped transition.

6. The layout structure of swing arm assembly according to claim 1, wherein a side of the hub motor close to the inside of the vehicle is provided with a brake disc; the brake disc is coaxially connected to the rotor of the hub motor; the brake disc is located between the upper swing arm and the lower swing arm, an end of the lower swing arm is provided with a swing arm connection portion, the swing arm connection portion extends vertically; the stator of the hub motor is provided with a lower ball joint, and a top end of the swing arm connection portion is universally connected with the lower ball joint.

7. The layout structure of swing arm assembly according to claim 6, wherein the swing arm connection portion is integrally formed with the lower swing arm.

8. The layout structure of swing arm assembly according to claim 4, wherein the lower swing arm has a same structure as the upper swing arm.

* * * * *